Figure 1:
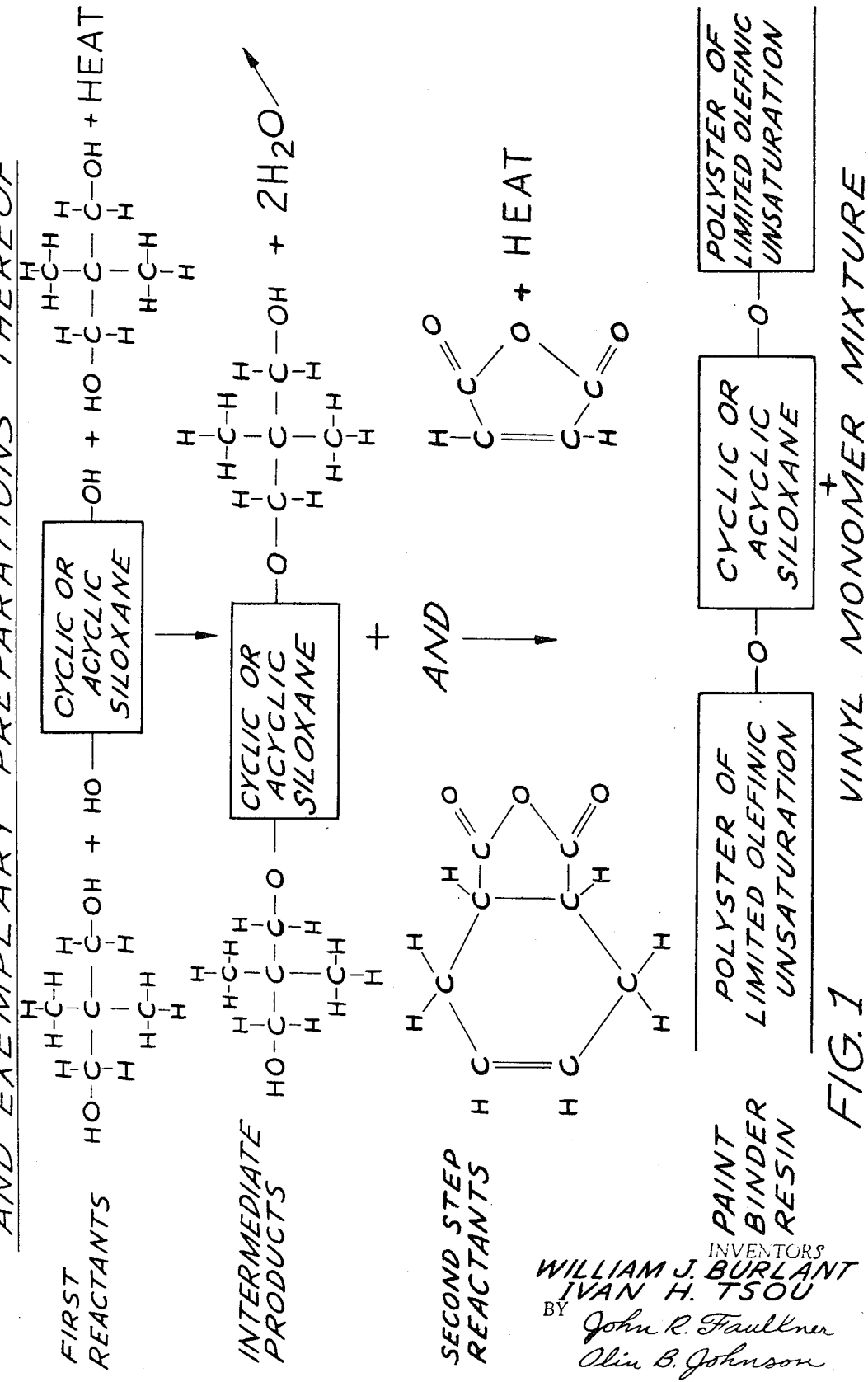

United States Patent

[11] 3,632,399

| [72] | Inventors | William J. Burlant<br>Detroit;<br>Ivan H. Tsou, Pontiac, both of Mich. |
|---|---|---|
| [21] | Appl. No. | 768,427 |
| [22] | Filed | Oct. 17, 1968 |
| [45] | Patented | Jan. 4, 1972 |
| [73] | Assignee | Ford Motor Company<br>Dearborn, Mich.<br>Continuation-in-part of application Ser. No. 479,445, Aug. 13, 1965, now Patent No. 3,437,512, Continuation-in-part of application Ser. No. 487,100, Aug. 13, 1965, now Patent No. 3,437,513. This application Oct. 17, 1968, Ser. No. 768,427 The portion of the term of the patent subsequent to Apr. 8, 1986, has been disclaimed. |

[54] RADIATION-CURED SILOXANE-MODIFIED-POLYESTER COATED ARTICLE
38 Claims, 2 Drawing Figs.

| [52] | U.S. Cl. | 117/93.31, 117/161 K, 117/161 ZA, 204/159.13, 204/159.19, 260/827 |
|---|---|---|
| [51] | Int. Cl. | B44d 1/50 |
| [50] | Field of Search | 117/93.31, 161 K, 161 ZA; 204/159.12, 159.13, 159.14, 159.16, 159.19; 260/824, 827, 861, 46.5 |

[56] References Cited
UNITED STATES PATENTS

| 2,842,517 | 7/1958 | Shorr | 260/827 |
| 2,849,527 | 8/1958 | Rogers et al. | 260/827 |
| 2,900,277 | 8/1959 | Schmitz et al. | 204/159.13 |
| 3,065,158 | 11/1962 | Zack | 204/159.13 |
| 3,246,054 | 4/1966 | Guenther et al. | 117/93.31 |

*Primary Examiner*—Alfred L. Leavitt
*Assistant Examiner*—J. H. Newsome
*Attorneys*—John R. Faulkner and Olin B. Johnson ABSTRACT: A film-forming, radiation-polymerizable, paint binder solution of vinyl monomers and an alpha-beta olefinically unsaturated, polysiloxane-modified polyester is applied as a liquid coating to an external surface of an article of manufacture and cured thereon with ionizing radiation. The resultant binder resin contains about 0.5 to about 5, preferably about 0.5 to about 3, alpha-beta olefinic unsaturation units per 1,000 units molecular weight. In one embodiment, the binder resin is formed by reacting a siloxane bearing at least two functional groups selected from hydroxy groups and hydrocarbonoxy groups with a polyhydric alcohol and subsequently reacting the siloxane-containing intermediate with a dicarboxylic acid which provides the resultant polymer with alpha-beta olefinic unsaturation and a second carboxylic acid that provides no additional alpha-beta olefinic unsaturation to the resulting polymer. In a second embodiment, the polyester is formed first by reacting the aforementioned polyhydric alcohol with the aforementioned carboxylic acids and subsequently reacting the resulting polymer with the siloxane.

RADIATION-CURED SILOXANE-MODIFIED-POLYESTER COATED ARTICLE

This application is a continuation-in-part of application Ser. No. 479,445 now U.S. Pat. No. 3,437,512 and application Ser. No. 487,100 now Pat. No. 3,437,513 both filed Aug. 13, 1965.

This invention relates to the art of coating and is concerned with paint articles of manufacture, particularly articles having external surfaces of wood, metal of polymeric solid coated with an adherent coating of a film-forming, radiation-polymerizable, paint binder solution of vinyl monomers and an alpha-beta olefinically unsaturated, polysiloxane-modified polyester.

In this application, the term "paint" is meant to include pigment and/or finely ground filler, the binder solution without pigment and/or filler or having very little of the same, which can be tinted if desired, and other surface coating compositions containing the binder solution which might be considered to be broadly analogous to enamel, varnish, or lacquer bases. Thus, the binder solution, which is ultimately converted to a durable film resistant to weathering, can be all or virtually all that is used to form the film, or it can be a vehicle for pigment and/or particulate filler material.

The term "ionizing radiation" as employed herein means radiation having sufficient energy to effect polymerization of the paint films herein disclosed, i.e., energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitter and the workpiece where the intervening space is occupied by air. Adjustment can be made for the relative resistance of the intervening gas which is preferably an oxygen-free inert gas such as nitrogen or helium. We prefer to employ an electron beam which at its source of emission has average energy in the range of about 150,000 to about 450,000 electron volts.

The films formed from the preferred embodiments of the paints of this invention are advantageously cured at relatively low temperatures, e.g., between room temperature (20° to 25° C.) and the temperature at which significant vaporization of its most volatile component is initiated, ordinarily between 20° and 70° C. The radiation energy is applied at dose rates of about 0.1 to about 100 Mrad per second upon a preferably moving workpiece with the coating receiving a total dose in the range of about 0.1 to about 100, ordinarily between about 1 and about 25, and most commonly between 5 and 15 Mrad. The films can be converted by the electron beam into tenaciously bound wear and weather resistant, coatings which meet the following specifications.

| Substrate Applicability | Type of Exposure | Requirements of Test |
|---|---|---|
| wood or metal | room temperature water soak | withstand 240 hours immersion in water at 20° to 25° C. (68° to 77° F.) without significant loss of gloss or film integrity, i.e. without blistering, checking, cracking or peeling |
| wood | cyclic boiling and baking | withstand 25 cycles—each 4 hours immersion in boiling water followed by 15 hours drying at 62° to 63° C. (about 144° to about 146° F.)—without significant loss of gloss or film integrity |
| metal | elongation | withstand 25% elongation without rupture—1 to 2 mil coating—⅛ inch mandrel |
| wood or metal | ultraviolet | withstand 2,000 hours exposure in Standard Atlas Ultraviolet Carbon Arc Weatherometer test without significant chalking and without loss of gloss or film integrity |

At least about 10, advantageously about 15 to about 60, and preferably about 20 to about 50, weight percent of the binder resin is derived from the siloxane or siloxanes employed. The binder resins of this invention preferably have an average molecular weight in excess of about 1,000, advantageously about 2,000 to about 20,000 although resins of substantially lower molecular weight can be used. They contain about 0.5 to about 5, advantageously about 0.5 to about 3, and more preferably about 1 to about 3, alpha-beta olefinic unsaturation units per 1,000 units molecular weight. In the pain binder solution, the resin is employed with at least one, preferably at least two different vinyl monomers, e.g., an acrylic monomer and a vinyl hydrocarbon monomer.

Figure 2:
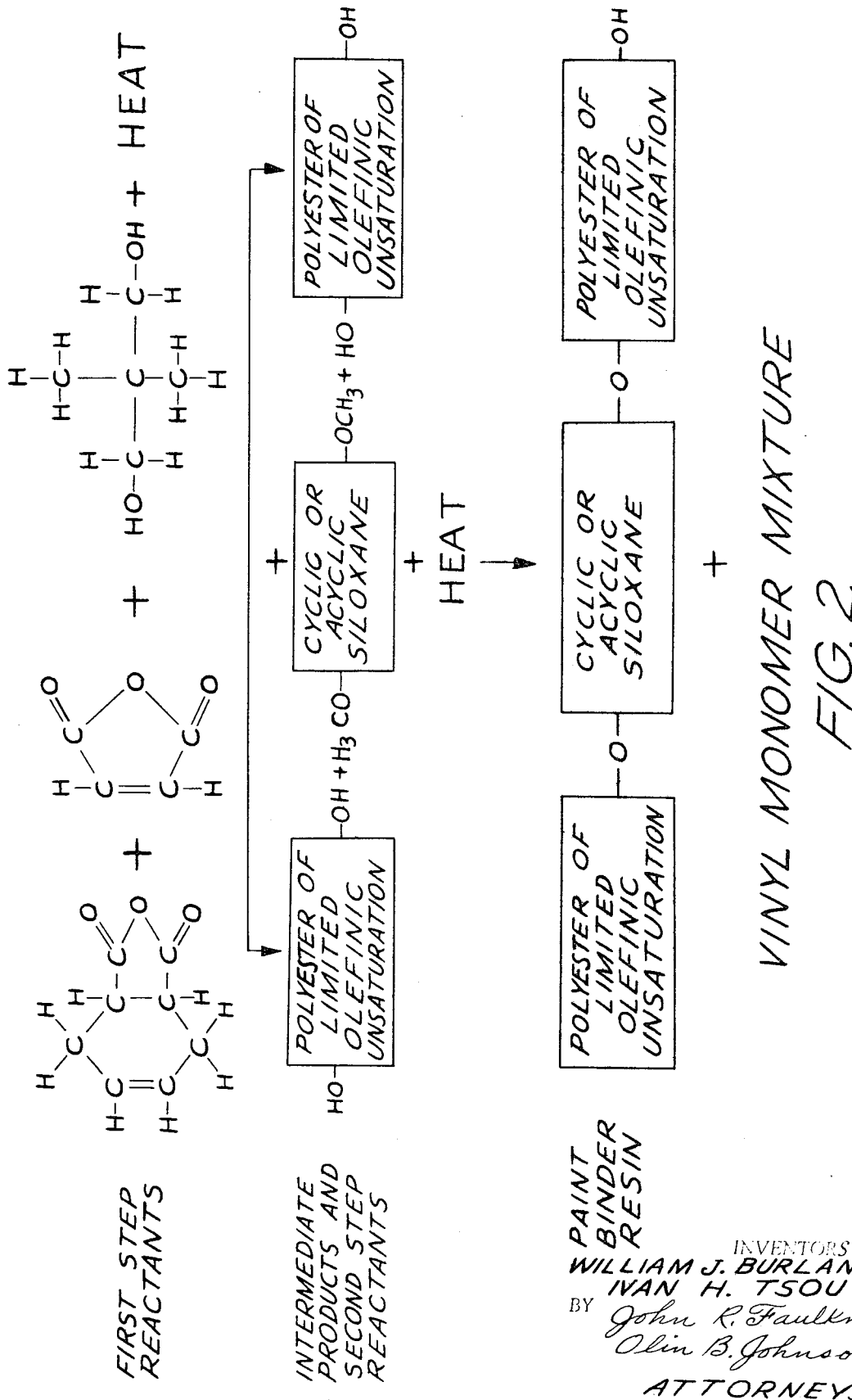

FIG. 1 illustrates one method of preparing the paint binder resins disclosed herein; and FIG. 2 illustrates a second method for preparing the paint binder resins disclosed herein.

In one embodiment, the binder resin is formed by reacting a siloxane having at least two functional groups in its molecular structure selected from the group consisting of hydroxy groups and hydrocarbonoxy groups with a polyhydric alcohol or alcohols to form a hydroxylated intermediate which is then reacted with an alpha-beta olefinically unsaturated dicarboxylic acid and a second multicarboxylic acid which provides no additional alpha-beta olefinic unsaturation to the resulting polyester.

In a second embodiment, the binder resin is formed by first forming a hydroxyl terminated polyester from the aforementioned polyhydric alcohol or alcohols, the alpha-beta unsaturated dicarboxylic acid and said second multicarboxylic acid and then reacting two or more of said polyester molecules with the siloxane.

The term "alpha-beta olefinic unsaturation" as employed herein includes the radiation sensitive olefinic unsaturation resulting from the incorporation of maleic acid, or other acid of equivalent unsaturation for purposes of radiation polymerization, into the polyester. The preferred dicarboxylic acid for providing the desired alpha-beta olefinic unsaturation is maleic acid which is preferably employed in the form of its anhydride. Other acids and/or anhydrides that can be used for this purpose include, but not by way of limitation, fumaric, itaconic, chloromaleic, dichloromaleic, etc.

A second multicarboxylic acid, i.e., dicarboxylic or tricarboxylic acid, is also employed as a reactant in forming the polyester. Such second acid is selected from acids that will not provide additional alpha-beta olefinic unsaturation units and the relative quantities of the two acids are adjusted to provide the desired concentration of such unsaturation in the form of its anhydride. Suitable anhydrides for this purpose include phthalic, tetrahydrophthalic, 1,2,4-benzene tricarboxylic (trimellitic), etc.

The polyhydric alcohol is preferably a diol. Triols and other multihydric alcohols can be used but it is advisable to employ such alcohols in minor amounts with a major amount of diol. Suitable diols include, but not by way of limitation, ethylene glycol, propylene glycol, 1,3-butylene glycol, 2-butene-1,4-diol, 1,4-butane glycol, neopentyl glycol, 1,5-pentamethylene glycol, 1,6-hexamethylene glycol, decamethylene glycol, dimethylol benzenes, dihydroxy ethyl benzenes, etc. Multihydric alcohols include, but not by way of limitation, glycerol, pentaerythritol, etc. One hydroxyl group of a diol can be reacted with a hydroxyl or hydrocarbonoxy group on a suitable siloxane leaving the remaining hydroxyl group on the diol free for use in the second reaction step in the first embodiment.

The siloxanes employed in the preparation of the binder resins have a reactive hydroxyl or hydrocarbonoxy group bonded to at least two of its silicon atoms. The term "siloxane" as employed herein refers to a compound containing a

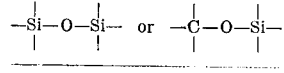

linkage, with the remaining valences being satisfied by a hydrocarbon radical, a hydrocarbonoxy group, hydrogen, a hydroxyl group, or an oxygen atom which interconnects the silicon atom providing such valence with another silicon atom.

The acyclic siloxane molecules which can be used in preparing the paint binder resins in this invention advantageously contain about three to about 18 silicon atoms per molecule with corresponding oxygen linkages. The preferred siloxanes are represented by the following general formula:

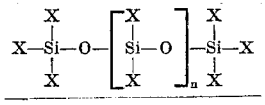

wherein $n$ is at least 1 and X is (a) a $C_1$ to $C_8$ monovalent hydrocarbon radical, preferably a $C_1$ to $C_4$ alkyl radical, or (b) $C_1$ to $C_8$ monovalent hydrocarbonoxy radical, preferably a $C_1$ to $C_4$ alkoxy radical, or (c) a hydroxyl radical, or (d) hydrogen, with at least two of the X groups separated by a

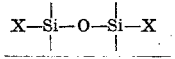

linkage being either (b) or (c).

The cyclic siloxanes which can be used in preparing the paint binder resins of this invention contain at least 3, preferably 6 to 12, and ordinarily not more than 18, silicon atoms per molecule with corresponding oxygen linkages. The cyclic polysiloxanes used may take the form of one of the following type formulas:

I. $X_{n'}Si_nO_{n''}$ where
  $n$ = an odd numbered positive integer of at least 3,
  $n' = 2n$, and
  $n'' = n$
  X = (a) a $C_1$ to $C_8$ monovalent hydrocarbon radical, preferably a $C_1$ to $C_4$ alkyl radical, or
  (b) a $C_1$ to $C_8$ monovalent hydrocarbonoxy radical, preferably a $C_1$ to $C_4$ alkoxy radical, or
  (c) a hydroxyl radical, or
  (d) hydrogen—with at least two of the X groups separated by a

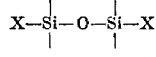

linkage being either (b) or (c)
Exemplified by the following formula:

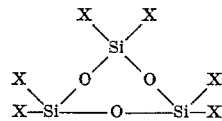

II. $X_{n'}Si_nO_{n''}$ where
  $n$ = an odd numbered positive integer of at least 5,
  $n' = n+3$, and
  $n'' = 6, 6+3$ or $6+$a multiple of 3
  X = (a) a $C_1$ to $C_8$ monovalent hydrocarbon radical, preferably a $C_1$ to $C_4$ alkyl radical, or
  (b) a $C_1$ to $C_8$ monovalent hydrocarbonoxy radical, preferably a $C_1$ to $C_4$ alkoxy radical, or
  (c) a hydroxyl radical, or
  (d) hydrogen—with at least two of the X groups separated by a

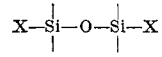

linkage being either (b) or (c)
Exemplified by the following structural formula:

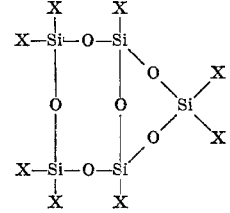

III. $X_{n'}Si_nO_{n''}$ where
  $n = 6$ or a multiple of 6,
  $n' = 8, 8+6$, or $8+$a multiple of 6
  $n'' = 8, 8+9$, or $8+$a multiple of 9
  X = (a) a $C_1$ to $C_8$ monovalent hydrocarbon radical, preferably a $C_1$ to $C_4$ alkyl radical, or
  (b) a $C_1$ to $C_8$ monovalent hydrocarbonoxy radical, preferably a $C_1$ to $C_4$ alkoxy radical, or
  (c) a hydroxyl radical, or
  (d) hydrogen—with at least two of the X groups separated by a

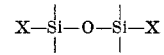

linkage being either (b) or (c)
Exemplified by the following structural formula:

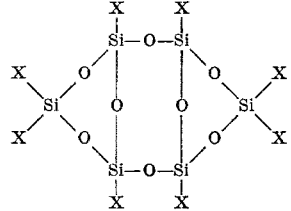

or a condensation dimer, trimer, etc., thereof formed with loss of water or alcohol.

IV. $X_{n'}Si_nO_{n''}$ where
  $n$ = an even numbered positive integer of at least 4,
  $n' = n+4$, and
  $n'' = 4, 4+3$, or $4+$a multiple of 3
  X = (a) a $C_1$ to $C_8$ nonvalent hydrocarbon radical, preferably a $C_1$ to $C_4$ alkyl radical, or
  (b) a $C_1$ to $C_8$ monovalent hyrdocarbonoxy radical, preferably a $C_1$ to $C_4$ alkoxy radical, or
  (c) a hydroxyl radical, or
  (d) hydrogen—with at least two of the X groups separated by a linkage being either (b) or (c)
Exemplified by the following structural formula:

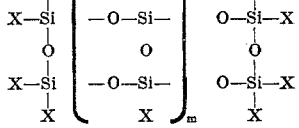

where $m$ is 0 or a positive integer.

V. $X_{n'}Si_nO_{n''}$ where
  $n$ = an even numbered positive integer of at least 8,
  $n' = n+2$, and
  $n'' = 11, 11+3$, or $11+$a multiple of 3
  X = (a) a $C_1$ to $C_8$ monovalent hydrocarbon radical, preferably a $C_1$ to $C_4$ alkyl radical, or
  (b) a $C_1$ to $C_8$ monovalent hydrocarbonoxy radical, preferably a $C_1$ to $C_4$ alkoxy radical, or
  (c) a hydroxyl radical, or
  (d) hydrogen—with at least two of the X groups separated by a

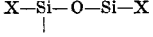

linkage being either (b) or (c)
Exemplified by the following structural formula:

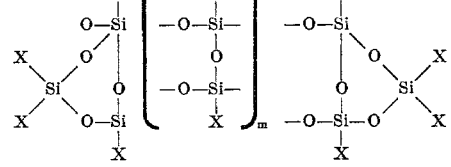

where $m$ is a positive integer.

A variety of methods are known to the art for preparing siloxanes. These include controlled hydrolysis of silanes, polymerization of a lower molecular weight siloxane, reacting silicon tetrachloride with an alcohol, etc. The preparation of siloxanes and their incorporation into organic resins is disclosed in U.S. Pat. Nos. 3,154,597; 3,074,904; 3,044,980; 3,044,979; 3,015,637; 2,996,479; 2,973,287; 2,937,230; and 2,909,549. The vinyl monomers employed with the binder resin are selected from acrylic monomers, e.g., acrylic and methacrylic esters such as methyl, ethyl, butyl, and 2-ethyl hexyl acrylates and methacrylates, acrylic acid and methacrylic acid in combination with such esters, and vinyl hydrocarbons, e.g., styrene and alkylated styrenes such as vinyl toluene, alpha-methyl styrene, etc. The mixture may include minor amounts of other vinyl monomers such as nitriles, e.g., acrylonitrile, acrylamide, or N-methylol acrylamide, vinyl halides, e.g., vinyl chloride, and vinyl carboxylates, e.g., vinyl acetate.

The paint film may be applied by any conventional technique such as spraying, roll coating, dip coating, flow coating, etc. The film is conventionally applied to an average depth in the range of about 0.1 to about 4 mils.

The invention will be more fully understood from the accompanying drawings and the following illustrative examples.

EXAMPLE 1

A siloxane-modified polyester, paint binder resin is prepared in the following manner:

To a reaction vessel are charged 1,330 lbs. of neopentyl glycol and 1,080 lbs. of a commercially available methoxylated partial hydrolysate of monophenyl and phenylmethyl silanes consisting essentially of dimethyltriphenyltrimethoxytrisiloxane (Dow Corning-Sylkyd 50) and have the following typical properties:

| | |
|---|---|
| Average molecular weight | 470 |
| Combining weight | 155 |
| Specific gravity at 77° F. | 1.105 |
| Viscosity at 77° F., centistokes | 13 |

The charge is heated to about 345° F. (174° C.) until about 215 lbs. methanol are removed overhead. The charge is cooled to about 250° F. (121° C.) after which there is added 196 lbs. maleic anhydride, 964 lbs. tetrahydrophthalic anhydride, 2.2 lbs. dibutyl tin oxide and 150 lbs. xylene. The temperature of the charge is raised slowly to about 420° F. (215° C.) and this temperature is maintained until the resulting resin has an acid number of 10. A vacuum is pulled to remove the xylene and 61 lbs. hydroquinone are charged and the charge is cooled to 200° F. and dumped into a mixing tank with 780 lbs. styrene.

A white mill base is then prepared by mixing 3,050 lbs. of $TiO_2$, 1,805 lbs. of resin, prepared as in the preceding paragraph, 146 lbs. of styrene, 507 lbs. of methyl methacrylate, and 20 lbs. of Bakers M.P.A., a waxlike, high molecular weight castor oil derivative to facilitate the grinding through viscosity adjustment and assist in retention of pigment dispersion in the grind, and passing the foregoing mixture through a conventional sand grinder.

This mill base is further diluted with styrene and methyl methacrylate in amounts such as to provide a paint comprising about 40 percent resin, 30 percent styrene and 30 percent methyl methacrylate. A film of the resulting paint is sprayed upon wood and metal panels and irradiated by an electron beam under the following conditions:

| | |
|---|---|
| Potential | 295 kv. |
| Current | 25 milliamperes |
| Distance, emitter to workpiece | 10 inches |
| Line speed | 1.6 cm./sec. |
| Passes | 2 |
| Total dosage | 10 Mrad |

EXAMPLE 2

The procedure of example 1 is repeated except that an equivalent amount of ethylene glycol is substituted for the neopentyl glycol.

EXAMPLE 3

The procedure of example 1 is repeated except that an equivalent amount of hexylene glycol is substituted for the neopentyl glycol.

EXAMPLE 4

The procedure of example 1 is repeated except that the methyl methacrylate component of the vinyl monomers is replaced with styrene and the tetrahydrophthalic acid component is replaced with an equivalent amount of trimellitic anhydride in the preparation of the resin.

EXAMPLE 5

The procedure of example 1 is repeated except that the styrene component of the vinyl monomers is replaced with an equimolar amount of methyl methacrylate.

EXAMPLE 6

The procedure of example 1 is repeated except that one half of the methyl methacrylate component of the vinyl monomers is replaced with an equimolar amount of butyl acrylate.

EXAMPLE 7

The procedure of example 1 is repeated except that one fourth of the styrene component of the vinyl monomers is replaced with an equimolar amount of 2-ethyl hexyl acrylate and the relative proportions of maleic anhydride and tetrahydrophthalic anhydride are adjusted to provide in the resin an amount of maleic anhydride which provides the resin with 5 alpha-beta olefinic unsaturation units per 1,000 molecular weight.

EXAMPLE 8

The procedure of example 1 is repeated except that one-third of the methyl methacrylate component of the vinyl monomers is replaced with an equimolar amount of ethyl acrylate.

EXAMPLE 9

The procedure of example 1 is repeated except that one-fifth of the styrene component of the vinyl monomers is replaced with an equimolar amount of alpha-methyl styrene.

EXAMPLE 10

The procedure of example 1 is repeated except that the maleic anhydride component of the vinyl monomers is replaced with an equimolar amount of fumaric acid.

EXAMPLE 11

The procedure of example 1 is repeated using the following materials to prepare the paint concentrate:

| | Parts by Weight |
|---|---|
| White mill base from example 1 | 5,680 |
| Siloxane-modified polyester resin prepared as in example 1 | 1,676 |
| Styrene | 1,050 |
| Methyl methacrylate | 1,527 |
| Green mill base | 267 |

The green mill base above referred to is prepared by first admixing 120 parts by weight a 50 percent xylene solution of a conventional acrylic paint binder resin (Gardner-Holdt Vis. at 77° F.-WX), 60 parts by weight phthalocyanine green, 61 parts by weight xylene. This mix is ground 48 hours in a steel ball mill to 8 Heg. after which 240 parts by weight of the acrylic polymer above mentioned and 60 parts by weight xylene are added and the mix is ground for an additional 2 hours. To the latter grind is added 264 parts by weight of the same acrylic polymer, 130 parts by weight of butylated melamine formaldehyde resin (60 percent solids, 20 percent xylene, 20 percent butanol) and 65 parts by weight xylene.

The paint concentrate thus prepared is diluted with styrene and methyl methacrylate to provide paints containing the following:

| Resin % | Styrene % | Methyl methacrylate % |
|---|---|---|
| 60 | 20 | 20 |
| 50 | 20 | 30 |
| 50 | 30 | 20 |
| 40 | 30 | 30 |

These paints are sprayed on wood and on metal panels and cured by irradiation as in the preceding examples.

EXAMPLE 12

A siloxane-modified polyester, paint binder resin is prepared in the following manner:

To a reaction vessel are charged 70 lbs. of neopentyl glycol, 10 lbs. of xylene, and 35 lbs. of a commercially available (Dow Corning Z-6018) hydroxy-functional, cyclic, polysiloxane having the following properties:

| | |
|---|---|
| Hydroxy content, Dean Stark | |
| percent condensable | 5.5 |
| percent free | 0.5 |
| Average molecular weight | 1,600 |
| Combining weight | 400 |
| Refractive index | 1.531 to 1.539 |
| Softening point, Durran's Mercury Method, degrees F. | 200 |
| At 60% Solids in xylene | |
| Specific gravity at 77° F. | 1.075 |
| Viscosity at 77° F., centipoises | 33 |
| Gardner-Holdt | A-1 |

The charge is heated to about 345° F. (174° C.) for 2½ hours, after which there is added 13.7 lbs. maleic anhydride, 54.2 lbs. of tetrahydrophthalic anhydride and 100 grams of dibutyl tin oxide. The temperature of the charge is raised slowly to about 430° F. (221° C.) and this temperature is maintained until the resulting resin has an acid number of about 10. Some of the xylene and water of reaction are removed during the cook and the excess is then removed by vacuum. To the charge is added 12.5 grams hydroquinone and the charge is cooled to 180° F. (82.5° C.) and diluted with 40 lbs. of styrene.

A white mill base is prepared by mixing 3,050 lbs. of $TiO_2$, 1,805 lbs. of resin, prepared as in the preceding paragraph, 146 lbs. of styrene, 507 lbs. of methyl methacrylate, and 20 lbs. of Bakers M.P.A., a waxlike, high molecular weight castor oil derivative to facilitate the grinding through viscosity adjustment and assist in retention of pigment dispersion in the grind, and passing the foregoing mixture through a conventional sand grinder.

This mill base is further diluted with styrene and methyl methacrylate in amounts such as to provide a paint comprising about 40 percent resin, 30 percent styrene and 30 percent methyl methacrylate. A film of the resulting paint is sprayed upon wood and metal panels and irradiated by an electron beam under the following conditions:

| | |
|---|---|
| Potential | 295 kv. |
| Current | 1 milliampere |
| Distance, emitter to workpiece | 10 inches |
| Line speed | 1.6 cm./sec. |
| Passes | 2 |
| Total dosage | 10 Mrad |

EXAMPLE 13

The procedure of example 12 is repeated except that a methoxy-functional, cyclic, siloxane is substituted for the hydroxy-functional, cyclic, siloxane previously used. In this reaction the byproduct is methanol. This siloxane contains 6 silicon atoms and corresponds to type formula IV on page 10. This procedure is repeated using dipropoxy tetramethylcyclotrisiloxane.

EXAMPLE 14

The procedure of example 12 is repeated except for the difference that an equivalent amount dibutoxy tetramethyldisiloxane is substituted for the dimethyltriphenyltrimethoxytrisiloxane.

EXAMPLE 15

The procedure of example 12 is repeated except for the difference that an equivalent amount of pentamethyltrimethoxytrisiloxane is substituted for the dimethyltriphenyltrimethoxytrisiloxane.

EXAMPLE 16

The procedure of example 12 is repeated except that one-fifth of the neopentyl alcohol is replaced with an equimolar amount of pentaerythritol.

EXAMPLE 17

The procedure of example 12 is repeated except that the potential of the electron beam is 175,000 volts, the workpiece is 6 inches from the electron emitter, the radiation atmosphere is helium, and the exposure is controlled to provide a total dose equivalent to that of example 12.

EXAMPLE 18

The procedure of example 12 is repeated except that the potential of the electron beam is about 400,000 volts, the workpiece is 10 inches from the electron emitter, the radiation atmosphere is nitrogen and carbon dioxide, and the exposure is controlled to provide a total dose equivalent to that of example 12.

EXAMPLE 19

A series of siloxane-modified polyester resins were prepared using the siloxane of example 12 and the following organic monomers.

Components, Parts by Weight

| Resin No. | Neopentyl Glycol | Siloxane | Maleic Anhydride | Phthalic Anhydride |
|---|---|---|---|---|
| 1 | 416 | 236 | 29 | 410 |
| 2 | 419 | 236 | 73 | 358 |
| 3 | 433 | 236 | 98 | 327 |
| 4 | 444 | 236 | 147 | 268 |
| 5 | 477 | 236 | 284 | 104 |
| 6 | 520 | 236 | 392 | — |

In each instance the neopentyl glycol and the siloxane were charged to a three neck flask fitted with a stirrer, thermometer, nitrogen inlet tube and a Barret trap and heated to 100° C. At this point, tetraisopropyl titanate (0.2 g. per 100 g. siloxane) was added. The reaction temperature was raised to 165° C. over a 2 hour period. Methanol was removed by distillation during this time. The reaction was cooled to 100° C. and the acidic components added. Upon heating, the esterification began at 180° C. (first water distillate) and continued while the temperature rose to 220° C. At this point, 3 weight percent xylene was added to aid the removal of water and the product was refluxed (225° C.) until the acid number reached 20. The solution was cooled to 100° C. and hydroquinone stabilizer (0.4 g. per 1,000 g. resin) and methyl methacrylate and styrene in equimolar amounts were added to the resin so that the molar ratio of polymer to vinyl monomer was one.

These solutions were applied as films to substrates, (drawn down on a phosphate treated steel panel with a wire wound rod), they were irradiated in a nitrogen atmosphere using 275 kilovolts, 25 milliamperes and a total dose of 36 Mrad.

The resultant films were tested and the results obtained are set forth below.

FILM PROPERTIES

| Resin # | DBPT [1] | Film thickness (mil) | Pencil hardness | MEK [2] resistance | Elongation, percent [3] |
|---|---|---|---|---|---|
| 1 | 0.4 | 0.9 | | Too soft to test | |
| 2 | 0.7 | 0.9 | HB | 16 | 16+ |
| 3 | 1.0 | 0.9 | F | 35 | 16+ |
| 4 | 1.5 | 0.9 | H | 50+ | 12 |
| 5 | 3.2 | 0.9 | H | 50+ | <2 |

(1) Alpha-beta double bonds per one thousand units molecular weight.

(2) Number of rubs by a soft rag soaked in methyl ethyl ketone before coaring was marred. One back and forth motion is counted as one rub.

(3) Conical Mandrel--A mandrel in the shape of a cone with a minimum diameter of ⅛ inch and a maximum diameter of 1.5 inches is used to measure the ability of the film on a substrate to withstand forming. The diameter of the mandrel at which film breakage occurs is then translated to the percent elongation of the cured film.

EXAMPLE 20

A resin is prepared from the following monomers:

|  | Mols | Grams |
| --- | --- | --- |
| Maleic anhydride | 3.6 | 353 |
| Tetrahydrophthalic anhydride | 6.4 | 973.8 |
| Neopentyl glycol | 9.395 | 978.49 |
| Diallylether of pentaerythritol | 2.81 | 607.8 |

A fusion cook of the neopentyl glycol and the tetrahydrophthalic anhydride is carried out over a 21-hour period. Water comes over at about 157° C. and a maximum temperature of about 205° C. is recorded. The resulting resin has an acid number of about 17. The maleic anhydride and the diallylether of pentaerythritol are added with about 1.46 grams hydroquinone and the charge is heated for about 13 hours. Water comes over at about 140° C. and a maximum temperature of about 186° C. is recorded.

A 25 percent siloxane-modified resin is prepared using 503.6 grams of the above resin and 167.8 grams of the hydroxy-functional, cyclic siloxane used in example 12, the hydrocarbon groups of which are predominantly phenyl groups. These materials are heated together for about 2.5 hours. Water comes over at about 139° C. and a maximum temperature of about 160° C. is recorded. The charge is cooled rapidly to about 100° C. at which time 0.112 grams hydroquinone is added with stirring and at about 80° C., 223.8 grams styrene are added.

The paint binder is prepared from 50 parts by weight of the foregoing siloxane-modified resin, 25 parts by weight styrene and 25 parts of methyl methacrylate. This binder is sprayed upon wood and metal panels and irradiated as in the previous examples. The cured paint binder exhibits a Sward Hardness after 2 passes of about 28–30 (about 10 Mrad) and after 4 passes about 56–58 (about 20 Mrad).

A pigmented paint is prepared by first preparing a mill base using the following ingredients:
  600 grams of $TiO_2$
  300 grams of the siloxane-modified resin, this example
  100 grams styrene
  100 grams methyl methacrylate This material is pebble ground for 20 hours and a paint is prepared from the following ingredients:
  100 grams above mill base
  19.4 grams siloxane-modified resin, this example
  23.4 grams methyl methacrylate
  18.57 grams styrene
  0.557 grams 2-hydroxy-4-actyloxy benzophenone (UV absorber)

This paint is sprayed upon wood and metal panels and irradiated as in the preceding examples. This paint exhibits a Sward Hardness of about 26 after 2 passes.

EXAMPLE 21

A 50 percent siloxane-modified resin is prepared in the following manner:

The original polyester resin is prepared from the following ingredients:

|  | Mols | Grams |
| --- | --- | --- |
| Maleic anhydride | 3.24 | 317.7 |
| Tetrahydrophthalic anhydride | 5.76 | 876.4 |
| Neopentyl glycol | 10.67 | 1,111.3 |
| Diallylether of pentaerythritol | 3.03 | 655.4 |
| Hydroquinone |  | 1.48 |

The same order of cooking is employed as in the preceding example. The cook is carried out over a period of 31 hours to an acid number of 10 with water over at about 147° C. and a maximum temperature of 190° C. is recorded.

Equal parts by weight (375.8) of the foregoing resin and the siloxane of example 1 are heated together for 2.5 hours with water over at about 135° C. and a maximum temperature of 173° C. recorded. The charge is cooled to about 100° C. at which time 0.124 part by weight of hydroquinone is added. The charge is further cooled to 80° C. at which time 247.9 parts by weight of styrene are added.

A paint binder consisting of 50 parts by weight of the above 50 percent siloxane-modified resin, 37.5 parts by weight styrene, and 37.5 parts by weight methyl methacrylate are sprayed upon test panels and irradiated as in the previous examples. The binder exposed to 2 passes (10 Mrad) demonstrates a Sward Hardness of about 44–48.

EXAMPLE 22

A resin is prepared from the following monomers:

|  | Mols | Grams |
| --- | --- | --- |
| Maleic anhydride | 3.6 | 353.0 |
| Tetrahydrophthalic anhydride | 6.4 | 973.8 |
| Neopentyl glycol | 14.0 | 1,458.1 |

A fusion cook of the tetrahydrophthalic anhydride and neopentyl glycol is carried out over a 23-hour period. Water comes over at about 165° C. and a maximum temperature of 180° C. is recorded. The resulting resin has an acid number of below 15 and is cooled to room temperature after which the maleic anhydride is added with 1.39 grams hydroquinone and 300 cc. xylene. The charge is heated to an acid number of 10 with water coming over at about 140° C. and a maximum temperature of 180° C. recorded.

A 25 percent siloxane-modified resin is prepared using 503.4 grams of the above resin and 167.8 grams of dimethyltriphenyltrimethoxytrisoloxane. The charge is heated for about 3 hours with methanol coming over at about 120° C. and a maximum temperature of 163° C. is recorded. The charge is then cooled rapidly to about 100° C. at which time 0.106 gram hydroquinone is added and at 80° C., 212.3 grams styrene are added.

A paint binder is prepared which includes 50 parts by weight of the above siloxane-modified resin, 25 parts by weight styrene and 25 parts by weight of methyl methacrylate. The binder is sprayed upon wood and metal panels and irradiated as in the previous examples. After 8 passes the coating exhibits a Sward of Hardness of 18.

Another paint binder is prepared using 25 parts by weight of the foregoing siloxane-modified resin, 10 parts by weight methyl methacrylate, 10 parts by weight styrene and 5 parts by weight ethylene glycol dimethacrylate. The binder is sprayed upon wood and metal panels and irradiated in the preceding examples. After 4 and 6 passes the coating exhibits a Sward Hardness of 16–18 and 26–28 respectively.

A mill base is prepared using the following ingredients:
  600 parts by weight $TiO_2$ 300 parts by weight Siloxane-modified resin, this example
  100 parts by weight Styrene
  100 parts by weight Methyl methacrylate This mix was ground 17 hours in a pebble mill. A paint was prepared using the following ingredients:
  110 parts by weight above mill base
  34.3 parts by weight Siloxane-modified resin, this example which contains 25 percent styrene
  3.7 parts by weight Styrene
  12.3 parts by weight Methyl methacrylate
  11.1 parts by weight Ethylene glycol and dimethyl methacrylate This paint is sprayed upon wood and metal panels and irradiated as in the previous examples. This coating after 4 passes exhibits a Sward Hardness of about 22.

EXAMPLE 23

A resin is prepared from the following monomers:

|  | Mols | Grams |
|---|---|---|
| Maleic anhydride | 3.44 | 337.3 |
| Tetrahydrophthalic anhydride | 2.82 | 429.0 |
| Neopentyl glycol | 12.4 | 1,291.5 |
| Diallylether of pentaerythritol | 3.72 | 804.6 |
| Hydroquinone |  | 1.43 |
| 300 cc. xylene |  |  |

A fusion cook of the tetrahydrophthalic anhydride and the neopentyl glycol is carried out until an acid number of about 10 is achieved. Water comes over at about 170° C. and a maximum temperature of about 195° C. is recorded. The charge is cooled to room temperature and the maleic anhydride and diallylether of pentaerythritol are added with the hydroquinone. The charge is heated and reflux starts at about 140° C. Heating is continued for 23 hours. A maximum temperature of 180° C. is recorded and the resin has an acid number of about 9.

A 50 percent siloxane-modified resin is repaired by heating 351.7 parts by weight of above resin and 351.7 parts by weight of dimethyltriphenyltrimethoxytrisiloxane. Methanol comes over at about 122° C. Heating is continued for 2.5 hours and a maximum temperature of 162° C. is recorded. The resin is cooled to 100° C. at which point 0.105 part by weight of hydroquinone is added. The resin is further cooled to 80° C. at which time 210.6 parts by weight styrene is added.

A mill base is prepared by grinding for 20 hours in a pebble mill the following ingredients:
   300 parts by weight of above siloxane-modified resin
   600 parts by weight of TiO$_2$
   100 parts by weight Styrene
   100 parts by weight Methyl methacrylate A paint is prepared from the above mill base, styrene, methyl methacrylate and ethylene glycol dimethylacrylate which breaks down as follows:
   32 percent TiO$_2$
   68 percent Vehicle
   50 parts by weight resin
   25 parts by weight styrene
   25 parts by weight methyl methacrylate
   10 parts by weight ethylene glycol dimethylacrylate This paint is sprayed upon wood and metal panels and irradiated as in the previous examples using a potential of 260 kv.

EXAMPLE 24

The procedure of example 23 is repeated except that the relative molecular weights of the siloxane and of the polyester are adjusted to provide a siloxane-modified polyester wherein said siloxane constitutes about 10 weight percent of the polyester binder resin.

EXAMPLE 25

The procedure of example 23 is repeated except that the relative molecular weights of the siloxane and of the polyester are adjusted to provide a siloxane-modified polyester wherein said siloxane constitutes about 60 weight percent of the polyester binder resin.

The abbreviation Mrad as employed herein means 1,000,000 Rad. The term "Rad" as employed herein means that dose of radiation which results in the absorption of 100 ergs of energy per gram of absorber, e.g., coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam, which may be about ⅛ in diameter at this point, is then scanned in one direction to make a fan-shaped beam and then passed through a metal window, e.g., a magnesium-thorium alloy, aluminum, etc., of about 0.003 inch thickness.

The binder is preferably applied to the substrate and cured thereon as a continuous film of substantially even depth, preferably a depth in the range of about 0.1 to about 4.0 mils depending upon the substrate and the intended end use of the coated product. The paint binder solution advantageously contains about 15 to about 70, preferably 40 to 60, percent of the siloxane-modified binder resin and about 15 to about 70, preferably 40 to 60, percent of unpolymerized vinyl monomers. In a preferred embodiment the vinyl monomers of the paint binder are a mixture of about 30 to 70, preferably 40 to 60, and more preferably 45 to 55, percent acrylic monomers with the balance nonacrylic vinyl monomers. For example, increased weathering resistance can be obtained by increased concentration of an acrylic monomer such as methyl methacrylate while a lowering of the requisite radiation dosage can be obtained by increasing the concentration of a vinyl hydrocarbon monomer such as styrene and the respective quantities of such monomers can be adjusted to fit the individual need.

The paint binder may be applied to the substrate by conventional spray techniques, or by brushing, roll coating, flow coating, or by the method commonly termed the silk screen process with appropriate adjustment in viscosity. The film-forming material should have a viscosity low enough to permit rapid application to the substrate in substantially even depth and high enough so that a 1 mil (0.001 inch) film will hold upon a vertical surface without sagging. The viscosity of the binder can be adjusted by varying the relative concentrations of the resin component and/or by varying the relative concentrations of dissimilar monomers within the monomer component. The binder is preferably applied to the substrate essentially free of nonpolymerizable organic solvents and/or diluents.

It will be understood by those skilled in the art that modifications can be made within the foregoing examples within the scope of the invention as hereinbefore described and hereinafter claimed.

We claim:

1. An article of manufacture comprising a substrate and an adherent coating of paint on an external surface thereof, said coating comprising the in situ formed polymerization product of a film-forming solution of vinyl monomers and an alpha-beta olefinically unsaturated siloxane-modified polyester cross-linked on said surface by ionizing radiation, said polyester having at least two carbon atoms of the principal carbon-to-carbon chain thereof separated by and connected to a divalent siloxane radical, said polyester being further characterized in that said siloxane comprises at least about 10 weight percent of said polyester and said alpha-beta olefinic unsaturation of said polyester is limited to a concentration in the range of about 0.5 to about 5 units per 1,000 units molecular weight.

2. An article of manufacture in accordance with claim 1 wherein said siloxane is a cyclic siloxane.

3. An article of manufacture in accordance with claim 1 wherein said siloxane is an acyclic siloxane.

4. An article of manufacture comprising a substrate and an adherent coating of paint on an external surface thereof having an average depth of about 0.1 to about 4 mils, said coating comprising pigment and the in situ formed polymerization product of a film-forming solution of vinyl monomers and an alpha-beta olefinically unsaturated siloxane-modified polyester cross-linked on said surface by ionizing radiation with an electron beam, said polyester having at least two carbon atoms of the principal carbon-to-carbon chain thereof separated by and connected to a divalent siloxane radical, said polyester being further characterized in that said siloxane comprises about 10 to about 60 weight percent of said polyester and said alpha-beta unsaturation of said polyester is limited to a concentration in the range of about 0.5 to about 3 units per 1,000 units molecular weight.

5. An article of manufacture in accordance with claim 4 wherein said siloxane is a cyclic siloxane containing about three to about 18 silicon atoms per molecule.

6. An article of manufacture in accordance with claim 4 wherein said siloxane is an acyclic siloxane containing about three to about 18 silicon atoms per molecule.

7. An article of manufacture in accordance with claim 4 wherein said vinyl monomers are a mixture of acrylic monomers and vinyl hydrocarbon monomers.

8. An article of manufacture comprising a substrate and an adherent coating of paint on an external surface thereof, said coating comprising the in situ formed polymerization product of a film-forming solution of vinyl monomers and an alpha-beta olefinically unsaturated siloxane-modified polyester cross-linked on said surface by ionizing radiation with an electron beam, said polyester being formed by first reacting a polyhydric alcohol and a siloxane having in its molecular structure at least two functional groups selected from the group consisting of hydroxyl groups and hydrocarbonoxy groups and subsequently reacting the resultant siloxane-containing reaction product with an alpha-beta olefinically unsaturated dicarboxylic acid or its anhydride and a second acid selected from the group consisting of dicarboxylic acids and tricarboxylic acids, the alpha-beta olefinic unsaturation of said polyester being provided solely by said alpha-beta olefinically unsaturated dicarboxylic acid with the relative proportions of said alpha-beta olefinically unsaturated dicarboxylic acid and said second acid being such as to limit the alpha-beta olefinic unsaturation units in said polyester to a concentration in the range of about 0.5 to about 5 units per 1,000 units molecular weight, said siloxane comprising at least about 10 weight percent of said polyester.

9. An article of manufacture in accordance with claim 8 wherein said siloxane is a cyclic siloxane.

10. An article of manufacture in accordance with claim 8 wherein said siloxane is an acyclic siloxane.

11. An article of manufacture comprising a substrate and an adherent coating of paint on an external surface thereof, said coating comprising pigment and the in situ formed polymerization product of a film-forming solution of vinyl monomers and an alpha-beta olefinically unsaturated siloxane-modified polyester cross-linked on said surface by ionizing radiation with an electron beam, said vinyl monomers being selected from the group consisting of acrylic monomers and vinyl hydrocarbon monomers, said polyester having a molecular weight of at least about 1,000 and at least two carbon atoms of the principal carbon-to-carbon chain thereof separated by and connected to a siloxane, said polyester being formed by first reacting a monomeric diol with a siloxane having in its molecular structure at least two functional groups selected from the group consisting of hydroxyl groups and hydrocarbonoxy groups and containing at least three silicon atoms and subsequently reacting the resultant siloxane-containing reaction product with an alpha-beta olefinically unsaturated dicarboxylic acid or its anhydride and a second acid selected from the group consisting of dicarboxylic acids and tricarboxylic acids, the composition of said second acid being such that the alpha-beta olefinic unsaturation of said polyester is provided solely by said alpha-beta olefinically unsaturated dicarboxylic acid with the relative proportions of said alpha-beta olefinically unsaturated dicarboxylic acid and said second acid being such as to limit the alpha-beta olefinic unsaturation units in said polyester to a concentration in the range of about 0.5 to about 5 units per 1,000 units molecular weight, said siloxane comprising about 15 to about 50 weight percent of said polyester.

12. An article of manufacture in accordance with claim 11 wherein said siloxane containing about three to about 18 silicon atoms per molecule.

13. An article of manufacture in accordance with claim 11 wherein said siloxane is an acyclic siloxane containing about three to about 18 silicon atoms per molecule.

14. An article of manufacture comprising a substrate and an adherent coating of paint on an external surface thereof, said coating comprising pigment and the in situ formed polymerization product of a film-forming solution of monovinyl monomers and an alpha-beta olefinically unsaturated siloxane-modified polyester cross-linked on said surface by ionizing radiation with an electron beam, said polyester having a molecular weight of about 1,000 to about 20,000 and at least two carbon atoms of the principal carbon-to-carbon chain thereof separated by and connected to a siloxane, said polyester being formed by first reacting a diol with a siloxane having in its molecular structure at least two functional groups selected from the group consisting of hydroxyl groups and hydrocarbonoxy groups and containing about three to about 18 silicon atoms and subsequently reacting the resultant siloxane-containing reaction product with maleic anhydride and a second carboxylic acid component selected from the group consisting of dicarboxylic acids and tricarboxylic acids, the composition of said second acid being such that the alpha-beta olefinic unsaturation of said polyester is provided solely by said maleic anhydride with the relative proportions of said maleic anhydride and said second carboxylic acid component being such as to limit the alpha-beta olefinic unsaturation units in said polyester to a concentration in the range of about 0.5 to about 3 units per 1,000 units molecular weight, said siloxane comprising about 15 to about 50 weight percent of said polyester.

15. An article of manufacture comprising a substrate and an adherent coating of paint on an external surface thereof, said coating comprising pigment and the in situ formed polymerization product of a film-forming solution of vinyl monomers and an alpha-beta olefinically unsaturated siloxane-modified polyester cross-linked on said surface by ionizing radiation with an electron beam, said vinyl monomers being selected from the group consisting of acrylic monomers and vinyl hydrocarbon monomers, said polyester having a molecular weight of about 1,000 to about 20,000 and at least two carbon atoms of the principal carbon-to-carbon chain thereof separated by and connected to a siloxane, said polyester being formed by first reacting at least two molar parts of a diol with one part siloxane having in its molecular structure at least two functional groups selected from the group consisting of hydroxyl groups and hydrocarbonoxy groups and containing about three to about 18 silicon atoms and subsequently reacting the resultant siloxane-containing reaction product with an alpha-beta olefinically unsaturated dicarboxylic acid or its anhydride and a second acid selected from the group consisting of phthalic acid, tetrahydrophthalic acid, 1,2,4-benzene tricarboxylic acid and their anhydrides, the alpha-beta olefinic unsaturation of said polyester being provided solely by said alpha-beta olefinically unsaturated dicarboxylic acid with the relative proportions of said alpha-beta olefinically unsaturated dicarboxylic acid and said second acid being such as to limit the alpha-beta olefinic unsaturation units in said polyester to a concentration in the range of about 0.5 to about 3 per 1,000 units molecular weight, said siloxane comprising about 15 to about 60 weight percent of said polyester.

16. An article of manufacture in accordance with claim 15 wherein said dicarboxylic acid is maleic acid introduced in the form of its anhydride.

17. An article of manufacture in accordance with claim 15 wherein said second acid is tetrahydrophthalic acid introduced in the form of its anhydride.

18. An article of manufacture in accordance with claim 15 wherein said second acid is phthalic acid introduced in the form of its anhydride.

19. An article of manufacture in accordance with claim 15 wherein said acid is 1,2,4-benzene tricarboxylic acid introduced in the form of its anhydride.

20. An article of manufacture in accordance with claim 15 wherein said hydrocarbonoxy groups are $C_1$ to $C_8$ alkoxy groups.

21. An article of manufacture in accordance with claim 15 wherein said polyester contains about 1 to about 3 units of alpha-beta olefinic unsaturation per 1,000 units molecular weight.

22. An article of manufacture in accordance with claim 15 wherein said siloxane contains about six to about 12 silicon atoms per molecule.

23. An article of manufacture in accordance with claim 15 wherein said diol is a $C_2$ to $C_{10}$ diol.

24. An article of manufacture comprising a substrate and an adherent coating of paint on an external surface thereof, said coating comprising the in situ formed polymerization product of a film-forming solution of vinyl monomers and an alpha-beta olefinically unsaturated siloxane-modified polyester cross-linked on said surface by ionizing radiation with an electron beam, said vinyl monomers being selected from the group consisting of acrylic monomers and vinyl hydrocarbon monomers, said polyester having a molecular weight of about 1,000 to about 20,000 and at least two carbon atoms of the principal carbon-to-carbon chain thereof separated by and connected to a siloxane, said polyester being formed by first reacting neopentyl glycol with a siloxane having in its molecular structure at least two functional groups selected from the group consisting of hydroxyl groups and $C_1$ to $C_8$ alkoxy groups and containing about three to about 18 silicon atoms and subsequently reacting the resultant siloxane-containing reaction product with maleic anhydride and tetrahydrophthalic anhydride, the relative proportions of said maleic anhydride and said tetrahydrophthalic anhydride being such as to limit the alpha-beta olefinic unsaturation units in said polyester to a concentration in the range of about 1 to about 3 units per 1,000 units molecular weight, said siloxane comprising about 15 to about 50 weight percent of said polyester.

25. An article of manufacture comprising a substrate and an adherent coating of paint on an external surface thereof, said coating comprising the in situ formed polymerization product of a film-forming solution of vinyl monomers and an alpha-beta olefinically unsaturated siloxane-modified polyester cross-linked on said surface by ionizing radiation with an electron beam, said polyester being formed by first reacting a polyhydric alcohol, an alpha-beta olefinically unsaturated dicarboxylic acid or its anhydride and a second acid selected from the group consisting of dicarboxylic acids and tricarboxylic acids and subsequently reacting the resultant hydroxylated polymer with a siloxane having in its molecular structure at least two functional groups selected from the group consisting of hydroxyl groups and hydrocarbonoxy groups, the composition of said second acid being such that the alpha-beta olefinic unsaturation of said polyester is provided solely by said dicarboxylic acid with the relative proportions of said dicarboxylic acid and said second acid being such as to limit the alpha-beta olefinic unsaturation units in said polyester to a concentration in the range of about 0.5 to about 5 units per 1,000 units molecular weight, said siloxane comprising at least about 10 weight percent of said polyester.

26. An article of manufacture in accordance with claim 25 wherein said siloxane is cyclic siloxane.

27. An article of manufacture in accordance with claim 25 wherein said siloxane is an acyclic siloxane.

28. An article of manufacture comprising a substrate and an adherent coating of paint on an external surface thereof, said coating comprising pigment and the in situ formed polymerization product of a film-forming solution of monovinyl monomers and an alpha-beta olefinically unsaturated siloxane-modified polyester cross-linked on said surface by ionizing radiation with an electron beam, said polyester having a molecular weight of about 1,000 to about 20,000 and at least two carbon atoms of the principal carbon-to-carbon chain thereof separated by and connected to a siloxane, said polyester being formed by first reacting a diol, maleic anhydride and a second carboxylic acid component selected from the group consisting of dicarboxylic acids and tricarboxylic acids, and subsequently reacting the resultant hydroxylated polymer with a siloxane having in its molecular structure at least two functional groups selected from the group consisting of hydroxyl groups and hydrocarbonoxy groups, the composition of said second acid being such that the alpha-beta olefinic unsaturation of said polyester is provided solely by said maleic anhydride with the relative proportions of said maleic anhydride and said second acid being such as to limit the alpha-beta olefinic unsaturation units in said polyester to a concentration in the range of about 0.5 to about 3 units per 1,000 units molecular weight, said siloxane comprising about 15 to about 50 weight percent of said polyester.

29. An article of manufacture comprising a substrate and an adherent coating of paint on an external surface thereof, said coating comprising pigment and the in situ formed polymerization product of a film-forming solution of vinyl monomers and an alpha-beta olefinically unsaturated siloxane-modified polyester cross-linked on said surface by ionizing radiation with an electron beam, said vinyl monomers being selected from the group consisting of acrylic monomers and vinyl hydrocarbon monomers, said polyester having a molecular weight of about 1,000 to about 20,000 and at least two carbon atoms of the principal carbon-to-carbon chain thereof separated by and connected to a siloxane, said polyester being formed by first reacting a diol, an alpha-beta olefinically unsaturated dicarboxylic acid or its anhydride and a second acid selected from the group consisting of phthalic acid, tetrahydrophthalic acid, 1,2,4-benzene tricarboxylic acid and their anhydrides and subsequently reacting at least two molar parts of the resultant hydroxylated polymer with one molar part of a siloxane having in its molecular structure at least two functional groups selected from the group consisting of hydroxyl groups and hydrocarbonoxy groups, the alpha-beta olefinic unsaturation of said polyester being provided solely by said alpha-beta olefinically unsaturated dicarboxylic acid with the relative proportions of said alpha-beta olefinically unsaturated dicarboxylic acid and said second acid being such as to limit the alpha-beta olefinic unsaturation units in said polyester to a concentration in the range of about 0.5 to about 3 per 1,000 units molecular weight said siloxane comprising about 15 to about 60 weight percent of said polyester.

30. An article of manufacture in accordance with claim 29 wherein said dicarboxylic acid is maleic acid introduced in the form of its anhydride.

31. An article of manufacture in accordance with claim 29 wherein said second acid is tetrahydrophthalic acid introduced in the form of its anhydride.

32. An article of manufacture in accordance with claim 29 wherein said second acid is phthalic acid introduced in the form of its anhydride.

33. An article of manufacture in accordance with claim 29 wherein said acid is 1,2,4-benzene tricarboxylic acid introduced in the form of its anhydride.

34. An article of manufacture in accordance with claim 29 wherein said hydrocarbonoxy groups are $C_1$ to $C_8$ alkoxy groups.

35. An article of manufacture in accordance with claim 29 wherein said polyester contains about 1 to about 3 units of alpha-beta olefinic unsaturation per 1,000 units molecular weight.

36. An article of manufacture in accordance with claim 29 wherein said diol is a $C_2$ to $C_{10}$ diol.

37. An article of manufacture in accordance with claim 29 wherein said siloxane contains about six to about 12 silicon atoms per molecule.

38. An article of manufacture comprising a substrate and an adherent coating of paint on an external surface thereof, said coating comprising the in situ formed polymerization product of a film-forming solution of vinyl monomers and an alpha-beta olefinically unsaturated siloxane-modified polyester cross-linked on said surface by ionizing radiation with an electron beam, said vinyl monomers being selected from the group consisting of acrylic monomers and vinyl hydrocarbon monomers, said polyester having a molecular weight of about 1,000 to about 20,000 and at least two carbon atoms of the principal carbon-to-carbon chain thereof separated by and connected to a siloxane, said polyester being formed by first reacting the resultant hydroxylated polymer with a siloxane having in its molecular structure at least two functional groups selected from the group consisting of hydroxyl groups and $C_1$ to $C_8$ alkoxy groups and containing about three to about 18 silicon atoms, the relative proportions of said maleic anhydride and said tetrahydrophthalic anhydride being such as to limit the alpha-beta olefinic unsaturation units in said polyester to a concentration in the range of about 1 to about 3 units per 1,000 units molecular weight, said siloxane comprising about 15 to about 50 weight percent of said polyester.